United States Patent [19]
Okada

[11] Patent Number: 5,113,993
[45] Date of Patent: May 19, 1992

[54] THREE WAY SPLITTER

[75] Inventor: Goro Okada, Glen Rock, N.J.

[73] Assignee: Sandvik Process Systems, Inc., Totowa, N.J.

[21] Appl. No.: 678,250

[22] Filed: Apr. 1, 1991

[51] Int. Cl.$^5$ ............................................. B65G 47/46
[52] U.S. Cl. ...................................... 198/369; 198/372
[58] Field of Search ............... 198/367, 369, 372, 436, 198/782, 785

[56] References Cited

U.S. PATENT DOCUMENTS

| | | |
|---|---|---|
| 2,613,790 | 10/1952 | Schottelkotte . |
| 3,219,166 | 11/1965 | Collins et al. .......................... 198/782 |
| 3,262,538 | 7/1966 | Englander ............................ 198/436 |
| 3,272,298 | 9/1966 | Cato ..................................... 198/436 |
| 4,081,078 | 3/1978 | Richardson et al. . |
| 4,264,002 | 4/1981 | Van Der Schie . |
| 4,372,435 | 2/1983 | Bradbury ............................. 198/369 |
| 4,703,844 | 11/1987 | Jahns ................................... 198/367 |
| 4,792,034 | 12/1988 | Leemkuil ............................. 198/372 |
| 5,012,914 | 5/1991 | Berends et al. ..................... 198/372 |

FOREIGN PATENT DOCUMENTS

| | | | |
|---|---|---|---|
| 1943778 | 4/1978 | Fed. Rep. of Germany ...... | 198/785 |
| 59-26820 | 2/1984 | Japan . | |
| 62-150430 | 9/1987 | Japan . | |
| 62-186812 | 11/1987 | Japan . | |
| 63-272715 | 11/1988 | Japan . | |

Primary Examiner—Joseph E. Valenza
Attorney, Agent, or Firm—Burns, Doane, Swecker & Mathis

[57] ABSTRACT

A conveying system splits a stream of articles into three substreams. The system includes an infeed conveyor which conveys articles and aligns their centers of gravity along a central axis. A steering mechanism receives the articles and steers them selectively in one of three directions toward an outfeed conveyor arrangement. The outfeed conveyor arrangement includes a mouth formed by the intersection of three outfeed conveyors arranged to receive articles from the steering rollers. A centrally located one of the outfeed conveyors occupies less than one-third of the transverse width of the mouth, and each of the other two outfeed conveyors occupies more than one-third of the transverse width of the mouth. The steering rollers are turned by a fluid actuated mechanism which comprises two fluid cylinders affixed together in back-to-back relationship.

15 Claims, 4 Drawing Sheets

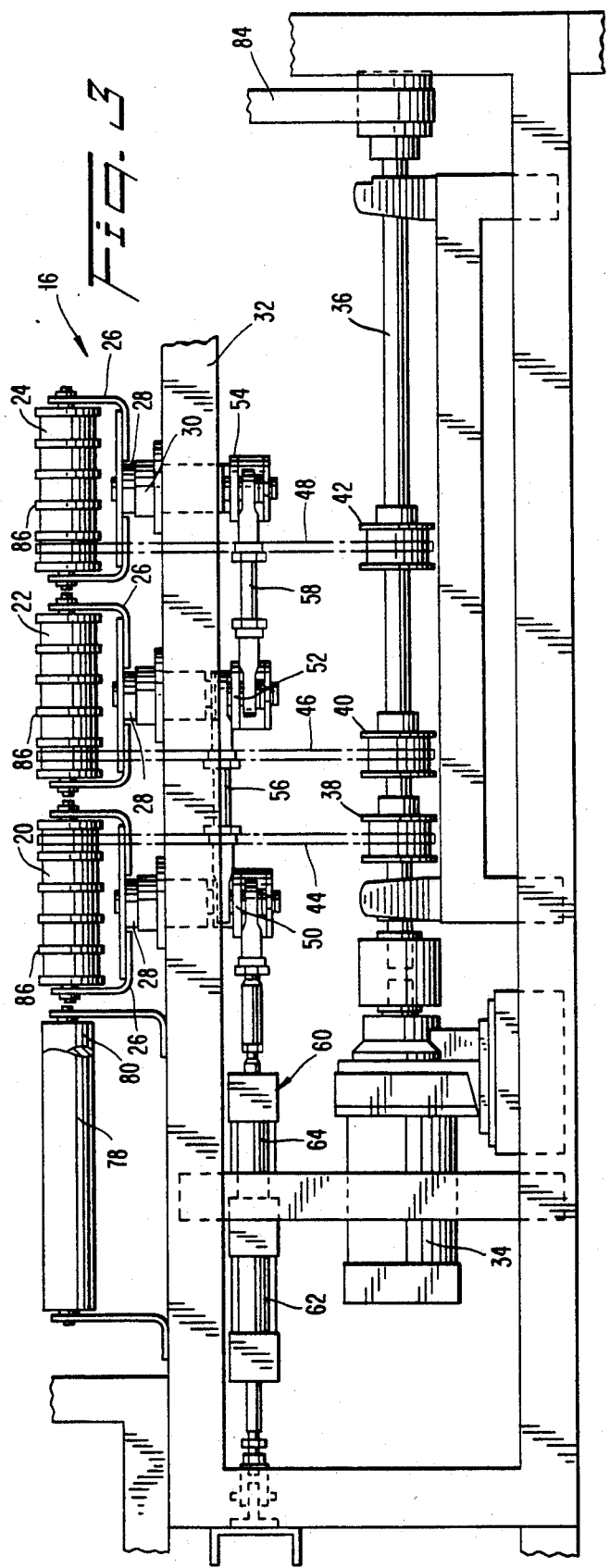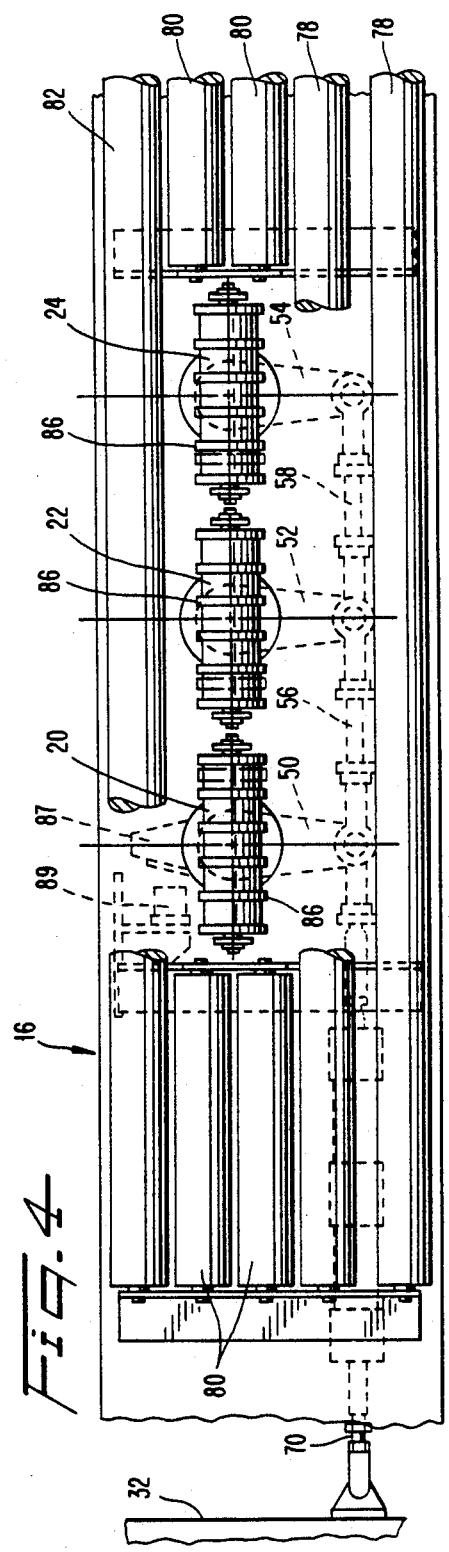

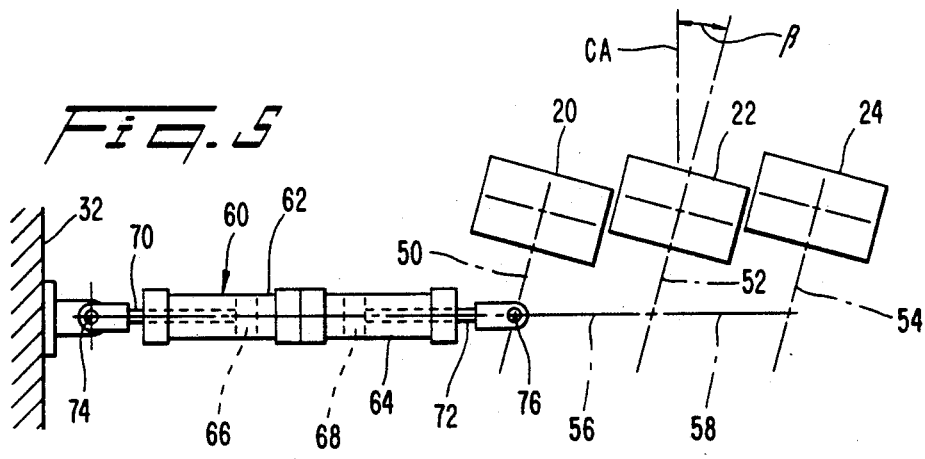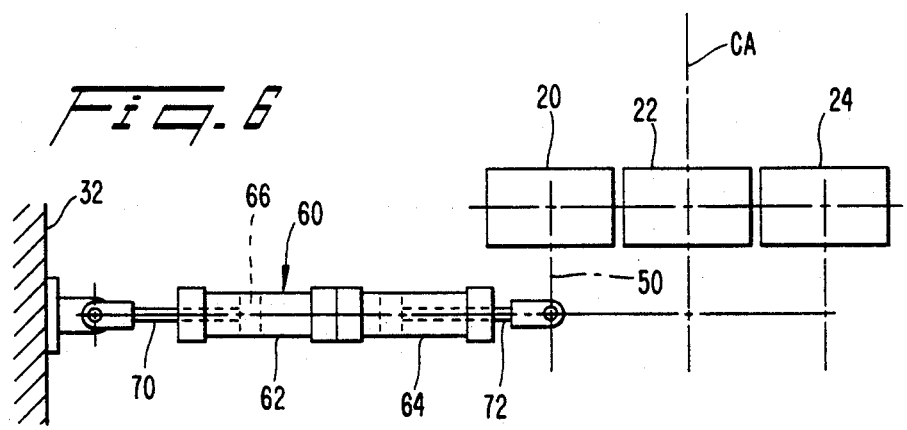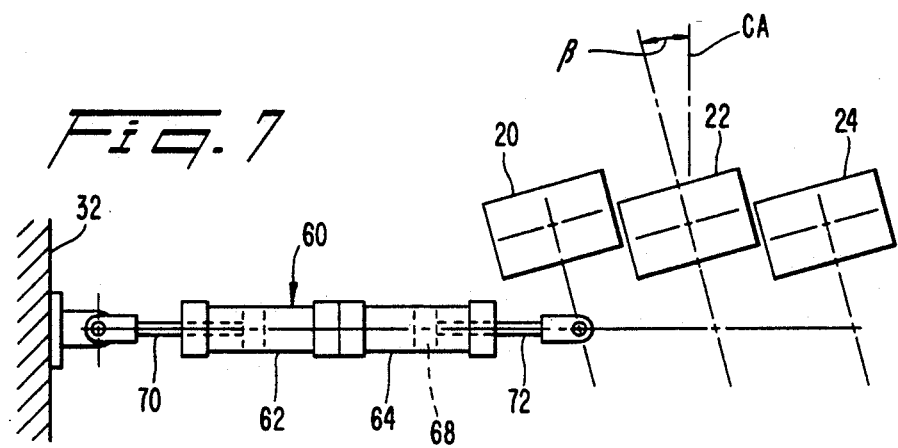

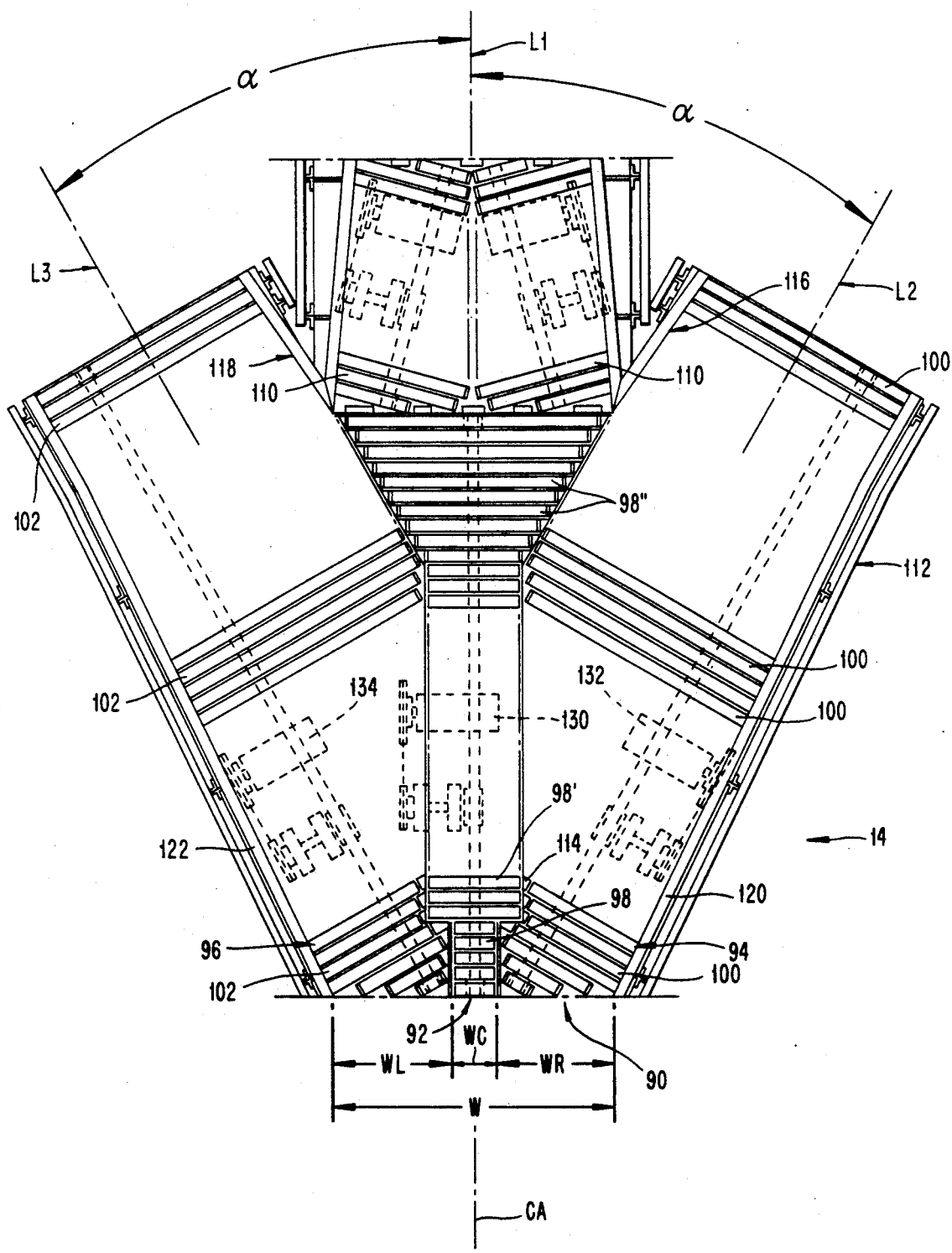

THREE WAY SPLITTER

BACKGROUND OF THE INVENTION

The present invention relates to a conveyor apparatus and, in particular, to a three-way splitter for splitting a stream of conveyed articles into three separate substreams.

A three-way splitter for conveyed articles has various uses. For example, it enables the articles to be split into three substreams which can be visually observed by separate inspectors. In the case of mailed packages being transported, the inspectors could view bar codes on the packages in order to assign each package to a particular designation within a conveying system. By splitting the articles, the resulting substreams can be conveyed at a relatively slow speed, while infeeding the main stream at a high speed. Eventually the substreams could be reconverged to re-form the main stream.

A three-way splitter typically diverts articles selectively to the right or left, or allows them to continue traveling straight ahead. The diverting of the articles to the right or left is often accomplished by means of steering rollers which are driven about horizontal axes and selectively turned about vertical axes as the articles pass thereover, in order to steer the articles to either the right or left onto a suitable right or left hand outfeed conveyor. If the steering rollers are not rotated, i.e., if their horizontal axes remain aligned, then the articles are steered straight ahead onto a central outfeed conveyor. It is desirable that the articles be conveyed as rapidly as possible, especially when large volumes of articles are being handled. However, the need to change the direction of packages to the right or left results in the overall speed of conveyance being reduced. It would be desirable to minimize that loss of speed.

SUMMARY OF THE INVENTION

The present invention relates to a conveying system for conveying articles selectively in three directions. The conveying system comprises an infeed conveyor for conveying articles, a steering mechanism, and an outfeed conveyor mechanism. The steering mechanism includes a plurality of steering rollers situated downstream of the infeed conveyor for receiving articles therefrom. The rollers are rotatable about respective horizontal axes of rotation and are turnable about respective vertical axes. The steering rollers are rotated about their axes of rotation to advance the articles. A mechanism is provided for turning the steering rollers simultaneously about their vertical axes between first, second, and third positions for steering the articles in central, rightward, and leftward directions, respectively. The outfeed conveyor mechanism is situated downstream of the steering mechanism and defines a transverse mouth for receiving articles from the steering mechanism. The outfeed conveyor mechanism includes a central conveyor, a right-hand conveyor, and left-hand conveyor. The central conveyor defines a first longitudinal outfeed axis and includes a first series of driven rollers arranged to convey articles along that axis. The right-hand conveyor is oriented rightwardly relative to the first outfeed axis as viewed in plan and includes a second series of driven rollers arranged obliquely relative to the first outfeed axis. The left-hand conveyor is oriented leftwardly relative to the first outfeed axis as viewed in plan and includes a third series of driven rollers arranged obliquely relative to the first outfeed axis. The center conveyor occupies less than one-third of the transverse width of the mouth. Each of the right-hand and left-hand conveyors occupies more than one-third of the transverse width of the mouth.

Preferably, the center conveyor is of increased transverse width at a location closely downstream of the mouth. This is preferably accomplished by providing the first series of driven rollers with a first set of rollers extending from the mouth, and a second set of longer rollers disposed downstream of the first set of rollers. The juncture between the first and second sets of rollers preferably lies approximately at a point of intersection of first, second, and third longitudinal outfeed axes defined by the central, right-hand, and left-hand conveyors, respectively.

Preferably, each of the second and third series of rollers includes rollers which decrease in length toward the mouth.

The infeed conveyor defines a central axis aligned with the first longitudinal axis and is arranged to convey articles such that the centers of gravity of the articles travel substantially along the central axis.

The mechanism for turning the steering rollers preferably comprises first and second fluid cylinders each having a piston and piston rod. The cylinders are affixed end-to-end in mutual alignment so that the piston rods extend in aligned opposite directions. A first of the piston rods is secured to a frame. A second of the piston rods is operably connected to the steering rollers. The first position is defined when one of the piston rods is fully extended and the other piston rod is fully retracted. One of the second and third positions is defined when both of the piston rods are fully extended. The other of the second and third positions is defined when both of the piston rods are fully retracted.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which:

FIG. 3 is a side elevational view of the steering mechanism, with the steering rollers arranged in their straight-ahead steering position;

FIG. 4 is a plan view of the steering mechanism depicted in FIG. 3;

FIGS. 5-7 are schematic views of a fluid steering device which positions the steering rollers in right-hand, straight ahead, and left-hand positions, respectively; and FIG. 8 is a plan view of an outfeed conveyor mechanism, with some of the rollers thereof removed for clarity.

DETAILED DESCRIPTION OF A PREFERRED EMBODIMENT OF THE INVENTION

Figure 1:
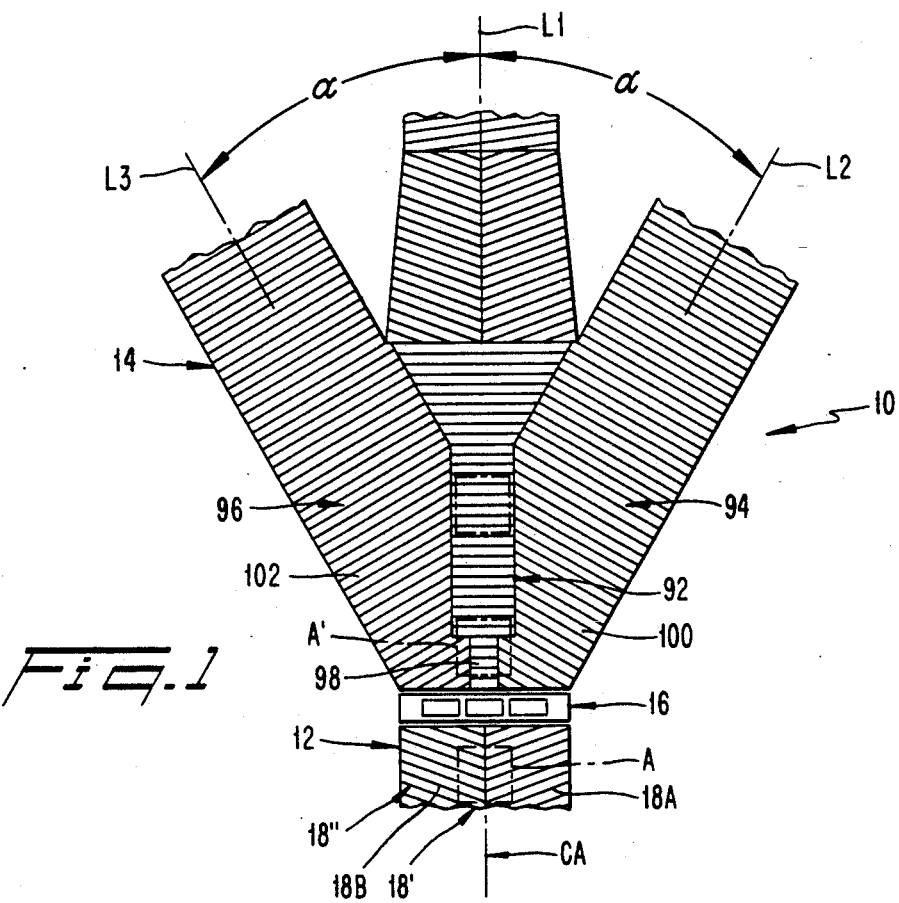
FIG. 1 is a schematic plan view of a conveyor system according to the present invention, including steering rollers arranged in a central or straight-ahead steering direction.

A three-way splitter 10 of a conveying system is depicted schematically in FIG. 1. That system includes an infeed conveyor 12, an outfeed conveyor arrangement 14, and a steering mechanism 16 disposed between a downstream end of the infeed conveyor and an upstream end of the outfeed conveyor arrangement. As will be explained in greater detail hereinafter, the steering mechanism 16 receives articles A being conveyed by the infeed conveyor 12 and steers the articles in one of three directions, i.e., rightward, leftward, or centrally (i.e., straight ahead). The outfeed conveyor arrangement 14 receives the thus-steered articles and continues to feed them in the steered direction.

Such a three-way splitter may be useful, for example, in splitting a stream of articles into three slower-moving substreams in order to enable inspection personnel to more easily inspect the articles. In the case of mailed packages for instance, the personnel may seek to identify bar codes on the packages in order to direct the packages to a proper designation in the system. By splitting the packages into substreams, the packages in the substreams can be conveyed at a reduced speed past the inspection personnel, i.e., at a speed less than the speed at which the packages are conveyed on the infeed conveyor 12.

The infeed conveyor 12 is of conventional design and comprises an arrangement of rollers which diverge forwardly. That is, there are two side-by-side rows 18A, 18B of driven rollers, the rollers of each row being rotated about horizontal axes inclined obliquely relative to a central axis CA of the infeed conveyor. The ends of the rollers are mounted in suitable bearings (not shown). Each roller is inclined such that its inner end 18' trails its outer end 18". Thus, the infeed conveyor is formed by forwardly diverging rollers which characteristically tend to align the center of gravity of each article along the central axis CA.

The steering mechanism comprises a plurality of steering rollers, i.e., preferably three steering rollers 20, 22, 24, formed of a high friction material such as an elastomer (e.g., rubber). The steering rollers are mounted in yokes 26 which carry vertically depending journals 28. Each roller is rotatable about a horizontal longitudinal axis within its respective yoke. The journals 28 are mounted in bearings 30 for turning movement about vertical axes. The bearings are stationarily mounted on a framework 32. A motor 34 drives a drive shaft 36 extending beneath the rollers. The drive shaft 36 carries three pulleys 38, 40, 42 which are operably connected to respective ones of the steering rollers by means of drive belts 44, 46, 48. Each drive belt extends around the periphery of its associated steering roller Thus, by rotating the drive shaft 36, the steering rollers are simultaneously rotated at identical speeds about their horizontal longitudinal axes.

The journals 28 project downwardly beyond a lower end of its respective bearing and are fixedly attached to the inner ends of respective levers 50, 52, 54 (see FIG. 4). The outer ends of the levers are interconnected for common movement by means of links 56, 58 each of which is pivotably connected to two of the levers. One of the levers 50 is connected to an actuator in the form of a fluid actuated motor device 60. By extending and retracting a piston rod arrangement of the motor device, the steering rollers are rotated simultaneously about their vertical axes.

In order to be able to steer the articles in the three selected steering directions, it is necessary to situate the steering rollers in three corresponding positions, i.e., inclined to the right (see FIG. 2), inclined to the left, or non-inclined (see FIGS. 1 and 4). To ensure reliable steering, the positioning of the steering rollers should be performed with precision so that the orientation assumed by the rollers in any of the three positions is identical to the orientation previously assumed in that position, and so forth. Furthermore, in order to deal with the high-speed feeding of large volume of articles, it is necessary that the steering rollers should be turned rapidly.

The requirement of rapid, precision turning of the steering rollers is achieved by the fluid actuated motor device 60 which comprises a pair of fluid cylinders 62, 64 each carrying therein a piston 66, 68 and piston rod 70, 72 (see FIGS. 3 and 5-7). The cylinders 62, 64 are fixed together in back-to-back alignment such that their piston rods project in opposite, aligned directions. One of the piston rods 70 is pivotably connected at 74 to the frame 32, and the other piston rod 72 is pivotably connected at 76 to one of the levers 50. It will be appreciated that the piston of each cylinder is slidable between two extreme positions within its respective cylinder which correspond to fully extended and fully retracted positions of the respective piston rod.

When one of the piston rods 70 is fully extended, and the other piston rod is fully retracted, as shown in FIG. 6, the steering rollers are positioned in mutual alignment, whereby articles traveling over the steering rollers are steered centrally (i.e., straight ahead). When both of the piston rods 70, 72 are fully retracted (see FIG. 5), the steering rollers are inclined to the right relative to the central axis to define a rightward steering position. When both of the piston rods 70, 72 are fully extended (see FIG. 7), the steering rollers are inclined to the left relative to the central axis to define a leftward steering position.

In each of the three steering positions, both of the pistons are "bottomed out" against a shoulder of the cylinder. Therefore, it is ensured that the orientation assumed by the steering rollers in any of the three steering positions is identical to the orientation previously assumed in that position. That is, in the central steering position, the longitudinal axes of the steering rollers are aligned and oriented perpendicular to the central axis CA; in each of the rightward and leftward steering positions, the steering rollers are displaced by an acute angle 8 relative to the central axis.

Accordingly, the steering rollers are placed with precision in each of the three steering positions. Furthermore, the movements of the steering rollers are effected rapidly by simply pressurizing the cylinder to displace the piston. Since the piston will automatically be stopped at its proper position in response to bottoming out against the respective cylinder, there is no need to reduce the piston speed in order to prevent the piston from overshooting the desired position.

The lever 50 preferably has an opposite end (see FIG. 4) arranged to abut a buffer device 89 such as a rubber block, in order to dampen the shock during actuation of the fluid cylinder device 60.

The fluid motor device 60 is connected to any suitable source of fluid pressure, preferably pneumatic pressure, and is controlled by a suitable mechanism which sequentially places the motor device in the three steering positions. Thus, the first article is steered straight; the next article is steered to the right; the next article is steered to the left and then the cycle is repeated. Accordingly, the stream of articles is equally split into three substreams. Of course, other cycles of splitting would also be possible.

The steering mechanism includes a plurality of rollers displaced ahead of, behind, and to the sides of the steering rollers 20, 22, 24. Thus, there are two long rollers 78 disposed ahead, or upstream, of the steering rollers; pairs of short rollers 80 situated to the sides of the steering rollers; and a single long roller 82 situated behind, or downstream of, the steering rollers. The rollers 78, 80, 82 are driven such as by a power take-off belt 84 connected to the output shaft 36 (see FIG. 3).

The steering rollers 20, 22, 24 project above a horizontal plane containing the uppermost peripheries of the rollers 78, 80, 82 in order to ensure that the steering rollers are able to control the direction of travel of the articles. This is achieved by providing the steering rollers with annular ribs 86 of high-friction material, such as an elastomer. As is evident from FIG. 3, those ribs 86 project higher than the surrounding rollers 78, 80, 82, as well as higher than the rollers of the infeed and outfeed conveyor systems.

Referring now to FIG. 8, the outfeed conveyor arrangement 14 defines a transverse mouth 90 for receiving articles from the steering mechanism. The mouth has a transverse width W. Extending from the mouth are three outfeed conveyors, namely, a central outfeed conveyor 92, a right-hand outfeed conveyor 94, and a left-hand outfeed conveyor 96.

The central outfeed conveyor 92 comprises a first series of driven rollers 98 mounted for rotation about horizontal, parallel axes oriented perpendicular to the central axis CA, as viewed in plan. Therefore, the central outfeed conveyor defines a first longitudinal axis of conveyance L1 which is aligned with the central axis CA.

The right-hand outfeed conveyor 94 comprises a second series of driven rollers 100 mounted for rotation about horizontal parallel axes which are oriented perpendicular to a second longitudinal axis of conveyance L2 extending to the right side of the central conveyor and forming an angle relative to the first longitudinal axis L1.

The left-hand conveyor comprises a third series of driven rollers 102 mounted for rotation about horizontal parallel axes which are oriented perpendicular to a third longitudinal axis of conveyance L3. That third axis L3 extends to the left side of the central conveyor and also forms the angle $\alpha$ relative to the first longitudinal axis L1.

The angle $\alpha$ is preferably about 30° (thirty degrees), and the angle $\beta$ (see FIGS. 5 and 7) in which the steering rollers are turned to either the right or left from their central position would preferably be about 15° (fifteen degrees). The rotary speeds of the first, second, and third series of rollers 98, 100, 102 are the same.

In each of the right and left-hand outfeed conveyors 94, 96, the rollers 100, 102 become progressively shorter toward the mouth 90 of the outfeed conveyor arrangement 14. Thus, no gaps are created between the three outfeed conveyors through which small articles could fall.

When an article A is steered centrally (straight ahead) by the steering rollers (i.e., the steering rollers being in the central steering position of FIGS. 1 and 6), the article (see article A' in FIG. 1) will enter the mouth of the outfeed conveyor arrangement 14 with its center of gravity in alignment with the central axis CA. Thus, at least the portion of the article containing the center of gravity will be acted upon by the rollers 98 of the central outfeed conveyor 92, whereby the primary conveying influence on the articles will be imposed by those of rollers 98, and the articles will be conveyed straight-ahead thereby as depicted in FIG. 1.

Figure 2:
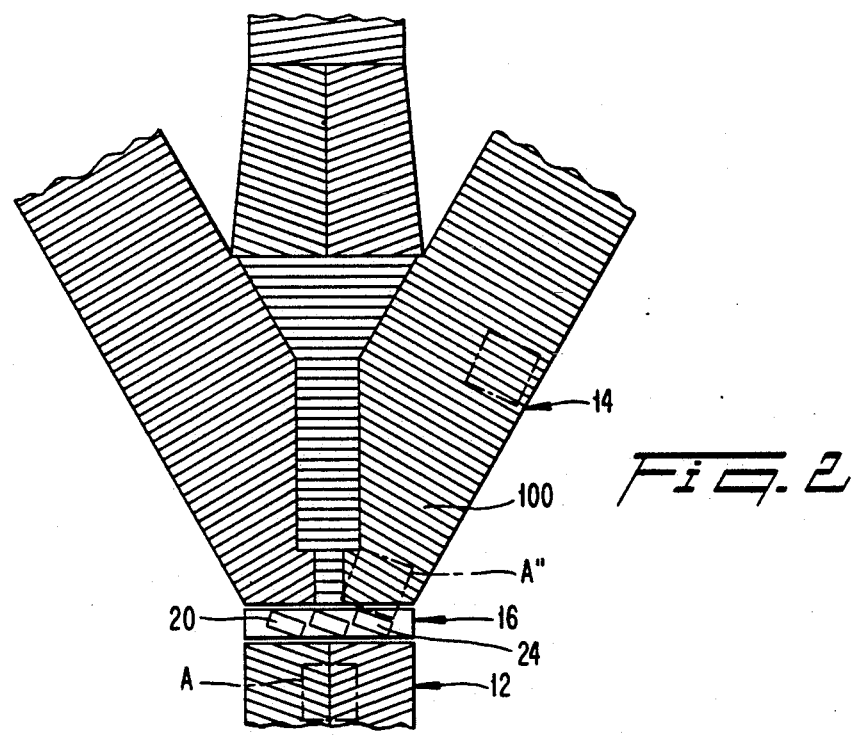
FIG. 2 is a view similar to FIG. 1 wherein the steering rollers are arranged for right-hand steering.

On the other hand, if the steering rollers are in the rightward steering position (see FIGS. 2 and 5), then the article will enter the mouth somewhat offset to the right of the central axis, as shown at A'' in FIG. 2. It is necessary in such a case to ensure that the primary conveying influence on the articles will be imposed by the rollers of the right-hand outfeed conveyor 94. This is accomplished by limiting the transverse width WC of the central outfeed conveyor at the mouth 90 to a value which is preferably less than one-third, more preferably less than one-fourth, and most preferably less than one-fifth of the total width W of the mouth 90. Thus, at least the first few rollers 98 of the central outfeed conveyor have a length (equal to WC) which is less than one-third of the width W. The right and left-hand outfeed conveyors 94, 96 have equal widths WR, WL at the mouth 90, each of which being greater than one-third of the total width W of the mouth 90.

By limiting the transverse width WC of the central outfeed conveyor 92 at the mouth 90, it is ensured that, during rightward steering, at least the portion of the article containing the center of gravity (previously aligned with the center axis CA by the infeed conveyor 12) will pass over the rollers of the right-hand outfeed conveyor 94 (rather than passing over the rollers of the central outfeed conveyor). As a consequence, the article will be conveyed to the right. A similar action occurs during leftward steering.

In order to ensure that articles intended to be conveyed centrally along the central outfeed conveyor 92 will continue to do so, despite the limited initial width WC of the central outfeed conveyor 92, the width of the central outfeed conveyor 92 is increased at a location downstream of the mouth 90. While that could be accomplished in a number of ways, e.g., by progressively increasing the lengths of the rollers of the first series of rollers 98, it is preferably accomplished by providing the first series of rollers with a second (downstream) set of rollers 98' which are of longer length than the first group or set of rollers of the first series 98. That second set of rollers 98' preferably starts at a location which coincides with the intersection of the three longitudinal axes L1, L2, L3 of the central, rightward, and leftward conveyors.

Consequently, an article being fed centrally on the initial rollers 98 of the central outfeed conveyor 92 will quickly reach the wider portion of that central conveyor defined by the set of longer rollers 98', so that the direction of conveyance becomes quickly stabilized and less prone to being diverted to the right or left.

A third, yet longer set of rollers 98'' can be provided downstream of the second set of rollers 98'. The rollers 98'' of the third set are of progressively longer lengths. Yet additional sets of rollers can be provided downstream of the rollers 98''. For example, a set of forwardly diverging rollers 110 can be provided.

It will be appreciated that some of the rollers 100, 102, 98' and 110 have been omitted from FIG. 8 for the sake of clarity. In an actual conveyor apparatus, the rollers would be arranged continuously along their respective conveying paths.

It will also be appreciated that the ends of the rollers are suitably mounted for rotation. For example, each roller may carry a pressed-in bearing which receives a stationary shaft carried by a framework 112. The shafts are carried by suitable blocks 114 which are situated at a lower level than the uppermost peripheries of the rollers. Thus, there are no divider walls disposed between the three outfeed conveyors 92, 94, 96, except for dividers 116, 118 disposed at the downstream end of the set of rollers 98". That means that portions of each article are able to overlie more than one of the outfeed conveyors simultaneously.

Upstanding guide rails 120, 122 are provided adjacent the outboard sides of the right and left-hand conveyors 94, 96.

The rollers of the three outfeed conveyors are driven at the same speed by any suitable conventional drive mechanism. For example, motors 130, 132, 134 are provided beneath the outfeed conveyor arrangement 14 for driving the rollers of those conveyors, respectively.

In operation, articles are conveyed at high speed by the infeed conveyor 14, with the centers of gravity thereof being aligned with the central axis CA. The steering rollers 20, 22, 24 are sequentially turned between the three steering positions depicted in FIGS. 5, 6 and 7, respectively, by means of the dual cylinder arrangement 62, 64.

When the steering rollers are in the central position (FIG. 6), an article is steered straight ahead, whereupon the portion of the article containing the center of gravity is acted upon by the first set of rollers 98 of the central outfeed conveyor 92 in order to convey the article straight ahead (see article A' in FIG. 1). This occurs even if outer portions of the article are contacted by the rollers 100, 102 of the right and left-hand outfeed conveyors. The article quickly reaches the second set of rollers 98' and thus its straight-ahead direction of travel is fully stabilized.

The steering rollers are then turned to either a right or left-hand steering position. If turned to the right-hand steering position (FIGS. 2 and 5), the steering rollers direct the article to the right (see article A" of FIG. 2), whereupon the portion of the article containing the center of gravity overlies the rollers 100 of the right-hand conveyor 94, due to the narrow inlet width WC of the central conveyor 92 and the wider inlet WR of the right-hand conveyor 94. Consequently, the article is positively conveyed to the right. This occurs even if an outer portion of the article contacts the rollers 98 of the center outfeed conveyor.

The steering rollers are then turned to the leftward steering position (FIG. 7) and a steering action similar to that described with a right-hand turn takes place. The steering rollers are then returned to the center position (FIG. 6), and the steering cycle is repeated.

It will be appreciated that due to the narrowness of the inlet of the central outfeed conveyor 92, it is ensured that the portions of the articles containing the centers of gravity will overlie, and be controlled by, the rollers of the right (or left) hand conveyor during a right (or left) hand turn. The present of the wider rollers 98' closely downstream of the initial set of rollers 98 of the central outfeed conveyor 92 ensures that articles intended to be conveyed straight ahead will not be diverted from that path, notwithstanding the initial narrowness of the central outfeed conveyor 92.

The simplicity in actuating the fluid cylinder device 60, i.e., by displacing the two pistons 66, 68 between the limits of their respective strokes in order to define the three steering positions, enables the steering to be performed quickly and reliably by a relatively economical structure.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A conveying system for conveying articles selectively in three directions, comprising:
   an infeed conveyor for conveying articles;
   a steering mechanism including:
   a plurality of steering rollers situated downstream of said infeed conveyor for receiving articles therefrom, said rollers being rotatable about respective horizontal axes of rotation and turnable about respective vertical axes,
   means for rotating said steering rollers about said axes of rotation to advance the articles, and
   means for turning said steering rollers simultaneously about said vertical axes between first, second, and third positions for steering the articles in central, rightward and leftward directions, respectively; and
   outfeed conveyor means situated downstream of said steering mechanism and defining a transverse mouth for receiving articles from said steering mechanism, said outfeed conveyor means comprising:
   a central conveyor defining a first longitudinal outfeed axis and including a first series of driven rollers arranged to convey articles along said first longitudinal outfeed axis,
   a right-hand conveyor oriented rightwardly relative to said first longitudinal outfeed axis as viewed in plan, said right-hand conveyor including a second series of driven rollers arranged obliquely relative to said first longitudinal outfeed axis, and
   a left-hand conveyor oriented leftwardly relative to said first longitudinal outfeed axis as viewed in plan, said left-hand conveyor including a third series of driven rollers arranged obliquely relatively to said first longitudinal outfeed axis,
   said center conveyor occupying less than one-third of the transverse width of said mouth, and each of said right-hand and left-hand conveyors occupying more than one-third of the transverse width of said mouth.

2. A conveying system according to claim 1, wherein said center conveyor is of increased transverse width at a location downstream of said mouth.

3. A conveying system according to claim 2, wherein said first series of driven rollers includes a first set of rollers extending from said mouth, and a second set of longer rollers disposed downstream of said first set of rollers.

4. A conveying system according to claim 3, wherein said right and left-hand conveyors define second and third longitudinal outfeed axes, respectively, oriented at identical oblique angles relative to said first longitudinal outfeed axis.

5. A conveying system according to claim 4, wherein a juncture between said first and second sets of said first series of rollers lies approximately at a point of intersection of said first, second, and third longitudinal outfeed axes.

6. A conveying system according to claim 1, wherein said rollers of said first series of driven rollers are rotatable about horizontal, parallel axes oriented perpendicularly to said first longitudinal outfeed axis as viewed in plan.

7. A conveying system according to claim 1, wherein said rollers of each of said second and third series of driven rollers are rotatable about horizontal, parallel axes oriented perpendicularly to said second and third longitudinal outfeed axes, respectively, as viewed in plan.

8. A conveying system according to claim 7, wherein each of said second and third series of rollers includes rollers which decrease in length toward said mouth.

9. A conveying system according to claim 1, wherein said infeed conveyor defines a central axis aligned with said first longitudinal axis, said infeed conveyor arranged to align the centers of gravity of the articles substantially along said central axis.

10. A conveying system according to claim 9, wherein said infeed conveyor comprises pairs of driven rollers arranged in forwardly diverging relationship.

11. A conveying system according to claim 1, wherein said means for turning said steering rollers between said first, second and third positions comprises first and second fluid cylinders each having a piston and piston rod, said cylinders being affixed end-to-end in mutual alignment so that said piston rods extend in aligned opposite directions, a first of said piston rods being secured to a frame, a second of said piston rods being operably connected to said steering rollers, said first position being defined when one of said piston rods is fully extended and the other piston rod is fully retracted; one of said second and third positions being defined when both of said piston rods are fully extended; and the other of said second and third positions being defined when both of said piston rods are fully retracted 12. A conveying system according to claim 1, wherein said center conveyor occupies less than one-fourth of the transverse width of said mouth.

13. A conveying system according to claim 1, wherein said center conveyor occupies less than one-fifth of the transverse width of said mouth.

14. A conveying system for conveying articles selectively in three directions, comprising:
 an infeed conveyor defining a central axis and arranged to align the centers of gravity of the articles substantially along said central axis;
 a steering mechanism including:
  a plurality of steering rollers situated downstream of said infeed conveyor for receiving articles therefrom, said rollers being rotatable about respective horizontal axes of rotation and turnable about respective vertical axes,
  means for rotating said steering rollers about said axes of rotation to advance the articles, and
  means for turning said steering rollers simultaneously about said vertical axes between first, second, and third positions for steering the articles in central, rightward and leftward directions, respectively; and
 outfeed conveyor means situated downstream of said steering mechanism and defining a transverse mouth for receiving articles from said steering mechanism, said outfeed conveyor means comprising:
  a central conveyor defining a first longitudinal axis aligned with said central axis and including a first series of driven rollers arranged to convey articles along said first longitudinal outfeed axis,
  a right-hand conveyor oriented rightwardly relative to said first longitudinal outfeed axis as viewed in plan, said right-hand conveyor including a second series of driven rollers arranged obliquely relative to said first longitudinal outfeed axis, and
  a left-hand conveyor oriented leftwardly relative to said first longitudinal outfeed axis as viewed in plan, said left-hand conveyor including a third series of driven rollers arranged obliquely relatively to said first longitudinal outfeed axis,
  said right and left-hand conveyors define second and third longitudinal outfeed axes, respectively, oriented at identical oblique angles relative to said first longitudinal outfeed axis,
  each of said second and third series of rollers including rollers which decrease in length toward said mouth;
 said center conveyor occupying less than one-third of the transverse width of said mouth, and each of said right-hand and left-hand conveyors occupying more than one-third of the transverse width of said mouth;
 said first series of driven rollers including a first set of rollers extending from said mouth, and a second set of longer rollers disposed closely downstream of said first set of rollers.

15. A conveying system according to claim 14, wherein said means for turning said steering rollers between said first, second and third positions comprises first and second fluid cylinders each having a piston and piston rod, said cylinders being affixed end-to-end in mutual alignment so that said piston rods extend in aligned opposite directions, a first of said piston rods being secured to a frame, a second of said piston rods being operably connected to said steering rollers, said first position being defined when one of said piston rods is fully extended and the other piston rod is fully retracted; one of said second and third positions being defined when both of said piston rods are fully extended; and the other of said second and third positions being defined when both of said piston rods are fully retracted.

* * * * *